United States Patent Office 3,804,898
Patented Apr. 16, 1974

3,804,898
NOVEL BENZCYCLOBUTENE DERIVATIVES
Harm Jan Panneman, Oss, Netherlands, assignor to Akzona Incorporated, Asheville, N.C.
No Drawing. Filed July 21, 1971, Ser. No. 164,830
Claims priority, application Netherlands, Aug. 7, 1970, 7011683
Int. Cl. C07c 129/00, 133/10
U.S. Cl. 260—564 A
6 Claims

ABSTRACT OF THE DISCLOSURE

The present invention relates to novel benzcyclobutenyl guanidines of the general formula:

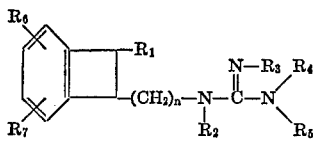

in which $n$ represents a number selected from 0, 1 and 2, $R_1$, $R_2$, $R_3$ and $R_4$ represent hydrogen or an alkyl group with 1–6 carbon atoms, $R_5$ is hydrogen, and alkyl groups with 1–6 carbon atoms or amino group, and $R_6$ and $R_7$ represent hydrogen, halogen, hydroxy, trifluoromethyl, a lower alkyl or alkoxy group or form jointly or severally an alkylene-dioxy group, as well as the acid addition salts thereof.

The substances according to the invention exert valuble antihypertensive properties and possess a very low toxicity.

---

The invention relates to novel benzcyclobutenyl guanidines of the general formula:

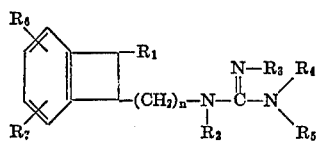

in which $n$ is number 0, 1 or 2, $R_1$, $R_2$, $R_3$ and $R_4$ are hydrogen or an alkyl group with 1–6 carbon atoms, $R_5$ is hydrogen, an alkyl group with 1–6 carbon atoms or an amino group, and $R_6$ and $R_7$ represent hydrogen, halogen, hydroxy, trifluoromethyl, lower alkyl or alkoxy, or form jointly or severally an alkylene dioxy group, as well as the acid addition salt thereof a pharmaceutically acid.

The above substances according to the General Formula I belong to an entirely new class of substances having surprising antihypertensive properties. Said substances can be applied for the normalization of an undesired high blood pressure in renal, neurogenic or essential hypertension. Said substances have no sympatomimetic side-effects, which usually occur after oral or parenteral administration of some known antihypertensive drugs. Moreover the toxicity ($LD_{50}$) of the drugs according to the invention is surprisingly lower than other substances, such as 1-indanyl-guanidine.

From the General Formula I it appears that the substances according to the invention possess an asymmetric carbon atom in the 1-position. Consequently the racemic mixture can be separated into its optical antipodes. Both optical antipodes exert antihypertensive properties. If $R_1$ in Formula I does not represent hydrogen, the substances according to the invention have another asymmetric center in the 2-position. This causes the existence of cis and transisomers. The relative optical antipodes and cis and transistomers, which can be obtained in a conventional manner, also belong to the substances according to the present invention.

The benzcyclobutenyl guanidines according to the General Formula I can be prepared by any method commonly applied for analogous compounds, starting from a compound of the general formula:

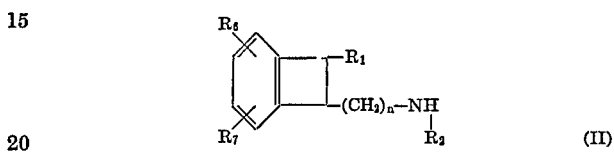

in which $n$, $R_1$, $R_2$, $R_6$ and $R_7$ have the meaning indicated above or an acid addition salt thereof.

Some substances according to the General Formula II are known, other substances can be prepared by any method described for the known compounds. The preparation of some compounds of Formula II above is disclosed in the article by J. A. Skorcz et al., "New 1-Aminomethylbenzocyclobutenes," in J. Med. Chem., 8, 255–257 (1965), cf, footnote 1 on p. 255; and also in Kaiser et al., U.S. Pat. 3,149,159 (1964).

The desired final product according to the General Formula I can be obtained, for example, by reacting a compound of the General Formula II, preferably an acid addition salt thereof, with a cyanamide of the general formula:

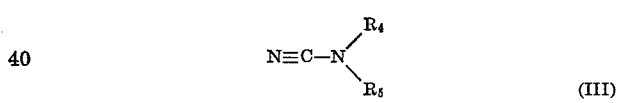

in which $R_4$ and $R_5$ have the meaning indicated above.

This reaction should preferably take place in an inert solvent by heating the products to the boiling point. This method results direct to a substance of the General Formula I, in which $R_3$ represents hydrogen. The substances according to the invention can also be prepared by reacting the starting substance II with an S-lower alkyl-isothioureum or O-lower alkyl-isoureum, especially with S-methylisothioureum, or with acid addition salts of these compounds having the general formula:

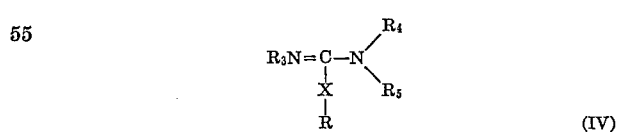

in which $R_3$, $R_4$ and $R_5$ have the meanings indicated above,

X represents an oxygen or sulphur atom, and

R a lower alkyl, preferably a methyl group.

Although this method can also be applied for the introduction of an N-substituted amidino group at starting substance II, it is preferably used for the introduction of an unsubstitued amidino group.

Anoher method for the preparation of the substances according to the invention is the reaction of the starting substance II, or an acid addition salt thereof, with a 2- lower alkyl-1-nitro-isothioureum or 2-lower alkyl-1-nitro-isoureum of the general formula:

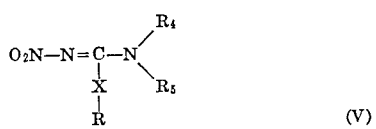

(V)

in which

R₄ and R₅ have the meaning indicated above,
X is an oxygen or sulphur atom, and
R is a lower alkyl, preferably a methyl group.

By this process a benzcyloubutenyl-nitro-guanidine derivative is obtained, which is converted direct into the desired final product by reducing the nitro-guanidine derivative with a suitable reducing agent, for example hydrogen in the presence of palladium on carbon as catalyst. However, this reaction only leads to substances, in which R₃ represents hydrogen.

The most conventional method for the preparation of the substance according to the invention is characterized in, that the starting substance II or an acid addition salt thereof is reacted with thiocyanic acid or an alkylisothiocyanate of the general formula:

in which R₃ has the meaning indicated above, to obtain an N-substituted thioureum derivative. By alkylation of the sulphur atom with an alkyl halide, preferably methyl iodide, a S-alkyl-isothioureum salt (halide of the S-alkyl-isothioureum compound) is obtained. By reacting this product with ammonia, an amine or hydrazine of the general formula:

(VII)

in which R₄ and R₅ have the meaning indicated above, or an acid addition salt thereof, the —S-alkyl group is replaced by a substituted or non-substituted amino group.

The resolution of the racemic compounds according to Formula I can be carried out by any suitable method known. Especially the method described by Montzka, J. Org. Chem., 33, 3993 (1968) can be applied advantageously.

Optical isomers having the General Formula I can be prepared by a resolution of the racemic end product according to Formula I, by a resolution of the starting product according to the General Formula II or by a resolution of any intermediate product in the synthesis of the end product according to Formula I. Preferably optical isomers of the General Formula I are prepared starting from an optical isomer according to the General Formula II.

The present new benzcyclobutenyl guanidine derivatives are mostly obtained as an acid addition salt, dependent upon the medium in which they are prepared. From the salt the free base can be prepared in a conventional manner, for example, by converting it with a strong base or by means of ion exchangers. Conversely, an acid addition salt can be obtained from the free base by neutralizing it with the desired acid.

For pharmaceutical application of the substances according to the invention the acid addition salts are preferably used because these salts have better physico-chemical properties than the corresponding free bases. Acid addition salts which can be applied are salts derived from a pharmaceutically acceptable acid such as hydrochloric acid, hydrobromic acid or hydroiodic acid, phosphoric acid, sulphuric acid, acetic acid, propionic acid, glycolic acid, maleic acid, malonic acid, succinic acid, tartaric acid, lactic acid, citric acid, ascorbic acid, salicylic acid and benzoic acid.

The substances according to the invention can be administered orally or parenterally, preferably in quantities between 0.05 and 10 mg. per kg. body weight. Mixed with suitable auxiliaries the substances can be compressed into solid dosage units such as pills, tablets or coated tablets. They can also be processed into capsules, mixed with auxiliaries, if required. By means of suitable liquids the substances can be applied as injection preparations in the form of solutions, suspensions or emulsions.

Very suitable benzcyclobutenyl-guanidine derivatives are:

1'-[1-(5-chlorobenzcyclobutenyl)]2',3'-dimethyl-guanidine
1'-[1-(4,6-dimethylbenzcyclobutenyl)]-guanidine
1'-(1-benzcyclobutenyl)-2',3'-dimethyl-guanidine
(+)-1'-(1-benzcyclobutenyl)-2',3'-dimethyl-guanidine
(—)-1'-(1-benzcyclobutenyl)-2',3'-dimethyl-guanidine
1'-(1-benzcyclobutenyl)-2'-methyl-guanidine
1'-(1-benzcyclobutenyl)-guanidine
1'-(1-benzcyclobutenylmethyl)-guanidine
1'-(1-benzcyclobutenyl)-2'-methyl-3'-amino-guanidine
1'-[1-(4,5-methylenedioxy-benzcyclobutenyl)]-guanidine
1'-[1-(5-methoxy-benzcyclobutenyl)]-2',3'-dimethyl-guanidine
1'-(1-benzcyclobutenyl)-2'-methyl-3'-methylamino-guanidine and the acid addition salts, especially the acetates and maleates, thereof.

The invention is illustrated further by the following examples.

EXAMPLE I

1'-(1-benzcyclobutenyl)-2',3'-dimethyl-guanidine maleate (a) 1'-(1-benzcyclobutenyl) - 3' - methylthioureum.—4.09 gm. of 1 - aminobenzcyclobutene hydrochloride (J. Med. Chem., 8, 255 (1965)) were suspended in 28 ml. of 1 N NaOH at 5° C., after which the free base formed was extracted with ether. Then the ether extract was evaporated to dryness and the residue taken up in 10 ml. of ethanol. To this solution was added a solution of 2.06 gm. of methylisothiocyanate in 5 ml. of ethanol, after which the reaction mixture was stirred for 24 hours at room temperature. The precipitate formed was filtered off, washed with ether and dried. The product obtained was recrystallized from benzenepetroleumether to obtain 3.75 gm. of 1'-(1-benzcyclobutenyl) - 3' - methylthioureum; melting point 129–130° C.

(b) 1' - (benzcyclobutenyl) - 2',3' - dimethylisothioureum hydroiodide.—To a suspension of 3.75 gm. of 1'-(1 - benzcyclobutenyl) - 3' - methylthioureum in 20 ml. of ethanol were added 1.25 ml. of methyliodide, after which the mixture was refluxed for 2 hours. Then the reaction mixture was evaporated to dryness in vacuo to obtain 1'-(1 - benzcyclobutenyl) - 2',3' - dimethylisothioureum hydroiodide as an oil in quantitative yield, which product was used immediately for further reaction.

(c) 1'-(1-benzcyclobutenyl)-2',3'-dimethyl - guanidine maleate.—6.51 gm. of 1'-(benzcyclobutenyl)-2',3'-dimethylisothiourem hydroiodide were dissolved in 12 ml. of ethanol, after which 8 ml. of a 5.5 N methylamine solution in ethanol were added. The reaction mixture was stirred for 48 hours at room temperature. Then 20 ml. of ether was added, after which the mixture was cooled down to 0° C. The resulting precipitate was filtered off, washed with ether and dried to obtain 5.32 gm. of 1'-(1-benzcyclobutenyl)-2',3'-dimethyl-guanidine hydroiodide; melting point 65–67° C. Next the chloroform solution of the hydroiodide obtained was extracted twice with 20 ml. of 4 N NaOH. The guanidine base was obtained as an oil after evaporation of the chloroform solution to dryness in vacuo. The oil obtained was dissolved in a little ethanol, after which a solution of 1.93 gm. of maleic acid in 3 ml. of ethanol was added. The maleate obtained crystalized after the addition of ether. After recrystallization from ethanol-ether 3.73 gm. of 1'-(1-benzcyclobutenyl)-2',3'-dimethyl-guanidine maleate were obtained; melting point 139–140° C.

Equivalent weight (HClO₄): Calculated for $C_{15}H_{19}N_3O_4$:

305. Found: 301.

*Analysis.*—Calculated for $C_{15}H_{19}N_3O_4$ (percent): C, 59.00; H, 6.27; N, 13.77; O, 20.96. Found (percent): C, 58.9; H, 6.4; N, 14.0; O, 20.9.

In the same manner were prepared:

1'-[1-(5-chlorobenzcyclobutenyl)]-2',3'-dimethyl-guanidine maleate,
1'-[1-(5-methoxybenzcyclobutenyl)]-2',3'-dimethyl-guanidine maleate M.P. 128–129° C., and
1'-[1-(5-trifluoromethylbenzcyclobutenyl)]-2',3'-dimethyl-guanidine maleate.

EXAMPLE II (A) 1'-(1-benzcyclobutenyl)-guanidine acetate (by means of 2-methyl-1-nitro-isothiourem)

(a) 1'-(1-benzcyclobutenyl)-2'-nitro - guanidine.—2.4 gm. of 1-aminobenzcyclobutene hydrochloride were suspended in 18 ml. of 1 N NaOH at 5° C., after which the free base obtained was extracted with ether. The ether extract was evaporated, after which the residue was taken up in 10 ml. of ethanol. To this ethanol solution were added 2.02 gm. of 2-methyl-1-nitroisothioureum, whereupon the mixture was stirred at room temperature for 24 hours. After 30 ml. of ether had been added, a precipitate formed, which was filtered off and dried. Obtained after recrystallization from 95% n.butanol 2.0 gm. of 1'-(1-benzcyclobutenyl)-2'-nitro-guanidine; melting point 177–178° C.

(b) 1'-(1-benzcyclobutenyl)-guanidine acetate.—To a suspension of 1.8 gm. of 1'-(1-benzcyclobutenyl)-2'-nitroguanidine in 30 ml. of glacial acetic acid were added 200 mg. of 10% palladium on carbon catalyst, after which hydrogen was bubbled through the suspension for 24 hours. The catalyst was filtered off, after which the filtrate was evaporated to dryness in vacuo. The residue was triturated with ether, after which it crystallized. After recrystallization from ethanol-ether 1.3 gm. of 1'-(1-benzcyclobutenyl)-guanidine acetate was obtained; melting point 149–150° C.

Equivalent weight (HClO₄): Calculated for $C_{11}H_{15}N_3O_2$:

221. Found: 227.

In the same manner were prepared:

1'-[1-(4,6-dimthylbenzcyclobutenyl)]-guanidine acetate,
1'-[1-(4,5-methylenedioxybenzcyclobutenyl)]-guanidine acetate,
1'-[1-(5-hydroxybenzcyclobutenyl)]-guanidine acetate.

(B) 1'-(1-benzcyclobutenyl)-guanidine acetate (by means of 2-methylisothioureum sulphate)

A mixture of 2.28 gm. of 1-aminobenzcyclobutene obtained from the corresponding hydrochloride as described in Example II(A) and 2.78 gm. of 2-methylisothioureum sulphate in 25 ml. of absolute ethanol were refluxed for 3 hours. Then the mixture was cooled down and filtered to remove any non-converted 2-methylisothiourem sulphate. The filtrate was evaporated to dryness in vacuo, after which the residue was treated with aqueous sodium hydroxide. The guanidine base obtained was extracted in methylene chloride, after which the extract was evaporated to dryness in vacuo. The residue was dissolved in dilute acetic acid and then this solution was evaporated to dryness. After recrystallization of the crystalline residue from ethanol-ether 2.1 gm. of 1'-(1-benzcyclobutenyl)-guanidine acetate was obtained; melting point 148–150° C. A mixture of this product with the substance obtained according to Example II(A)–(b) caused no fall in the mixed melting point.

EXAMPLE III

1'-(1-benzcyclobutenylmethyl)-guanidine acetate (a) 1'-(benzcyclobutenylmethyl)-2'-nitro-guanidine.— 8.48 gm. of 1-aminomethylbenzcyclobutene hydrochoride (J. Med. Chem., 8, 255 (1965)) were suspended in 55 ml. of 1 N NaOH at 5° C., after which the free base formed was extracted with ether. The ether extract was evaporated, after which the residue was taken up in 30 ml. of ethanol. To this ethanol solution 6.48 gm. of 2-methyl-1-nitro-isothioureum were added, whereupon the mixture was stirred for 24 hours at room temperature. Then 30 ml. of ether were added to obtain a precipitate, which was filtered off and dried. Obtained after recrystallization from 95% n.butanol 8.4 gm. of 1'-(1-benzcyclobutenylmethyl)-2'-nitro-guanidine; melting point 161–162° C.

(b) 1' - (1 - benzcyclobutenylmethyl)-guanidine acetate.—0.5 gm. of 10% palladium on carbon catalyst was added to a suspension of 8.0 gm. of 1'-(1-benzcyclobutenylmethyl)-2'-nitro-guanidine in 150 ml. of glacial acetic acid. Then hydrogen was bubbled through the mixture for 48 hours. The catalyst was filtered off and the filtrate evaporated to dryness in vacuo. The residue crystallized after trituration with ether. After recrystallization from ethanol-ether 4.7 gm. of 1'-(1-benzcyclobutenylmethyl)-guanidine acetaate was obtained; melting point 142–143° C.

Equivalent weight (HClO₄): Calculated for $C_{12}H_{17}N_3O_2$:

235. Found: 245.

EXAMPLE IV

1'-(1-benzcyclobutenyl)-2'-methyl-guanidine maleate 4.67 gm. of the 1'-(1-benzcyclobutenyl)2',3'-dimethyl-isothioureum hydroiodide described in Example I(b) were dissolved in 10 ml. of ethanol. To this solution was added 4 ml. of a 7 N ammonia solution in ethanol, after which the mixture was stirred at room temperature for 72 hours. After the addition of ether a precipitate formed, which was filtered off and dried. The thus obtained 1'-(1-benzcyclobutenyl)-2'-methyl-guanidine hydroiodide (3.1 gm.; melting point 167–168° C.) was suspended in 12 ml. of 4 N NaOH, after which the free base was extracted twice with chloroform, each time with 15 ml. The chloroform extract was dried over Na₂SO₄ and then evaporated to dryness. The residue was dissolved in 3 ml. of ethanol. To the ethanol solution was added a solution of 1.31 gm. of maleic acid in 3 ml. of ethanol. Then 10 ml. of ether was added to obtain a precipitate, which was filtered off, washed with ether and dried. Obtained after recrystallization from ethanol-ether 2.6 gm. of 1'-(1-benzcyclobutenyl)-2'-methyl-guanidine maleate; melting point 140–141° C.

Equivalent weight (HClO₄): Calculated for $C_{14}H_{17}N_3O_4$:

291. Found: 284.

In the same manner was prepared: (1' - (1-benzcyclobutenyl)-2'-methyl-3'-amino-guanidine maleate, but instead of ammonia hydrazine was used. M.P. 119–120° C.

EXAMPLE V

1'-[1-(2-methylbenzcyclobutenyl)]-guanidine hydrochloride 4.15 gm. of 1-amino-2-methylbenzcyclobutene hydrochloride, prepared in the manner described in J. Med. Chem. 8, 255 (1965), was suspended in 25 ml. of toluene, after which 1.05 gm. of cyanamide was added. The mixture was refluxed for 5 hours while stirring vigorously. The reaction mixture was evaporated in vacuo and the residue treated with aqueous sodium hydroxide, after which the free guanidine base formed was extracted with chloroform. The chloroform was removed in vacuo and the residue taken up in methanol. Then 1 equivalent HCl in ether was added to this solution, after which the resulting precipitate was filtered off to obtain 1.63 gm. of 1'-[1-(2-methylbenzcyclobutenyl)]-guanidine hydrochloride.

Equivalent weight (HClO$_4$): Calculated for $$C_{10}H_{14}N_3Cl:$$

212. Found: 206.

EXAMPLE VI (+) and (—)-1'-(1-benzcyclobutenyl)-2',3'-dimethyl-guanidine maleate (a) (+) and (—)-1-aminobenzcyclobutene·HCl.—A racemic mixture of 1-aminobenzcyclobutene is resolved in a manner as described by Montzka, J. Org. Chem., 33, 3993 (1968) using (+) or (—) tartaric acid-mono-o-chloroanilide as the resolution means and the (+) or (—) compound obtained converted to its HCl-salt.

(+)-1-aminobenzcyclobutene·HCl: melting point 205–206° C.; $[\alpha]_D^{20}=+20.0$ (c.=1.1 in methanol)

(—)-1-aminobenzcyclobutene·HCl: melting point 203–206° C.; $[\alpha]_D^{20}=-19.9°$ (c.=1.0 in methanol).

(b) (+)-1'-(1-benzcyclobutenyl)-2',3'-dimethyl-guanidine maleate.—(+)-1-aminobenzcyclobutene·HCl is converted to (+) - 1'-(1-benzcyclobutenyl)-2',3'-dimethylguanidine maleate in the manner as described in Example I.

Melting point 147–148° C.; $[\alpha]_D^{20}=+39.1$ (c.=1.016 in methanol).

(c) (—)-1'-(1-benzcyclobutenyl)-2',3'-dimethyl-guanidine maleate.—(—)-1-aminobenzcyclobutene·HCl is converted to (—) - 1' - (1-benzcyclobutenyl)-2',3'-dimethylguanidine maleate in the manner indicated in Example I.

Melting point 147–148° C.; $[\alpha]_D=-39.0$ (c.=1.052 in methanol).

What is claimed is:

1. A substance of the general formula:

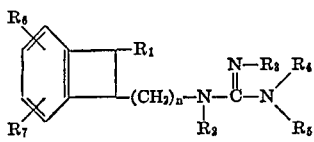

in which

R$_1$, R$_2$, R$_3$ and R$_4$ represent a member of the group consisting of hydrogen and alkyl groups with 1–6 carbon atoms, R$_5$ is selected from the group consisting of hydrogen, alkyl groups with 1–6 carbon atoms and the amino group, R$_6$ and R$_7$ are selected from the group consisting of hydrogen, halogen, hydroxy, trifluoromethyl, alkyl groups with 1–6 carbon atoms, alkoxy groups with 1–6 carbon atoms and jointly, alkylene dioxy groups, and n represents a number selected from 0, 1 and 2, acid addition salt thereof or a pharmaceutically acceptable acid.

2. A substance of the general formula:

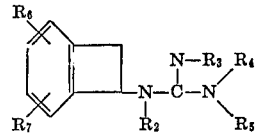

in which R$_2$, R$_3$, R$_4$, R$_6$ and R$_7$ have the meaning indicated in claim 1, or an acid addition salt thereof of a pharmaceutically acceptable acid.

3. A substance of the formula:

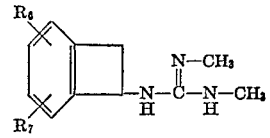

in which R$_6$ and R$_7$ have the meanings indicated in claim 1, or an acid addition salt thereof of a pharmaceutically accetpable acid.

4. 1'-(1-benzcyclobutenyl)-2',3'-dimethyl-guanidine and acid addition salt thereof of a pharmaceutically acceptable acid.

5. (—) - 1'-(1-benzcyclobutenyl)-2'3'-dimethyl-guanidine and acid addition salt thereof of a pharmaceutically accetpable acid.

6. (+) - 1' - (benzcyclobutenyl)-2',3'-dimethyl-guanidine and acid addition salt thereof of a pharmaceutically acceptable acid.

References Cited

UNITED STATES PATENTS 3,344,186  9/1967  Augstein et al. _____ 260—564 A

LEON ZITVER, Primary Examiner

G. A. SCHWARTZ, Assistant Examiner

U.S. Cl. X.R.

260—340.3, 340.5, 343.7, 501.14, 564 F; 424—280, 282, 316, 326

UNITED STATES PATENT OFFICE
CERTIFICATE OF CORRECTION

Patent No. 3,804,898    Dated April 16, 1974

Inventor(s) Harm Jan Panneman

It is certified that error appears in the above-identified patent and that said Letters Patent are hereby corrected as shown below:

Claim 1, column 8, line 10, should read -- or an acid salt thereof of a pharmaceutically acceptable acid --.

Cliam 2, the structural formula should appear as shown below:

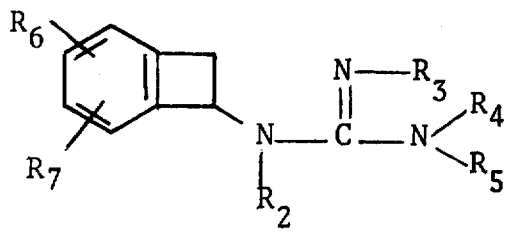

Signed and sealed this 24th day of September 1974.

(SEAL)
Attest:

McCOY M. GIBSON JR.
Attesting Officer

C. MARSHALL DANN
Commissioner of Patents